United States Patent
Itskin et al.

(10) Patent No.: US 9,571,451 B2
(45) Date of Patent: *Feb. 14, 2017

(54) CREATING NETWORK ISOLATION BETWEEN VIRTUAL MACHINES

(71) Applicant: International Business Machines Corporation, Armonk, NY (US)

(72) Inventors: Randall C. Itskin, Austin, TX (US); Vijayalakshmi Krishnamurthy, Tamilnadu (IN); Monica J. Lemay, Cedar Park, TX (US); Yogesh G. Patgar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,693

(22) Filed: Jun. 12, 2015

(65) Prior Publication Data
US 2016/0285826 A1    Sep. 29, 2016

Related U.S. Application Data (63) Continuation of application No. 14/671,120, filed on Mar. 27, 2015.

(51) Int. Cl.
*H04L 29/06* (2006.01)
*H04L 12/721* (2013.01)
(Continued)

(52) U.S. Cl.
CPC ....... *H04L 63/0236* (2013.01); *G06F 9/45558* (2013.01); *H04L 45/72* (2013.01);
(Continued)

(58) Field of Classification Search
CPC .... H04L 63/0236; H04L 45/72; H04L 45/745; G06F 9/45558; G06F 2009/45587; G06F 2009/45595
See application file for complete search history.

(56) References Cited

U.S. PATENT DOCUMENTS

| | | | |
|---|---|---|---|
| 6,047,325 A * | 4/2000 | Jain | H04L 12/4641 709/227 |
| 7,359,380 B1 * | 4/2008 | Maufer | H04L 45/16 370/389 |

(Continued)

OTHER PUBLICATIONS

Gomes et al., A Traffic Classification Agent for Virtual Networks Based on QoS Classes, Apr. 2012, IEEE Latin America Transactions, vol. 10, No. 3, pp. 1734-1741.*

(Continued)

*Primary Examiner* — Kenneth Chang
(74) *Attorney, Agent, or Firm* — Teddi E. Maranzano (57) ABSTRACT

A method, system, and program product for creating network isolation between virtual machines is provided, including receiving, by a security virtual machine (SVM), an outgoing network packet from a virtual machine (VM). The source internet protocol (IP) address and a source media access control (MAC) address is extracted from the outgoing network packet. A zone identifier table is searched for a zone id, whereby the zone identifier table includes the source IP address and the source MAC address. The outgoing network packet is sent to a physical Ethernet adapter connected to an external network switch whereby the external network switch is connected to an external network, based on the zone id not being found in the zone identifier table. The outgoing network packet is sent to a physical Ethernet adapter that is connected to an internal switch, based on the zone id being found in the zone identifier table.

6 Claims, 4 Drawing Sheets

(51) Int. Cl.
*H04L 12/741* (2013.01)
*G06F 9/455* (2006.01)

(52) U.S. Cl.
CPC .. *H04L 45/745* (2013.01); *G06F 2009/45587* (2013.01); *G06F 2009/45595* (2013.01)

(56) References Cited

U.S. PATENT DOCUMENTS

| | | | |
|---|---|---|---|
| 8,516,241 B2 | 8/2013 | Chang et al. | |
| 8,650,299 B1 | 2/2014 | Huang et al. | |
| 2004/0213272 A1* | 10/2004 | Nishi | H04L 29/12009 370/401 |
| 2008/0034414 A1* | 2/2008 | Mao | H04L 63/02 726/13 |
| 2009/0067440 A1* | 3/2009 | Chadda | H04L 63/0227 370/401 |
| 2010/0118868 A1* | 5/2010 | Dabagh | H04L 49/9042 370/389 |
| 2011/0318011 A1 | 12/2011 | Brassil | |
| 2013/0019277 A1* | 1/2013 | Chang | H04L 63/0218 726/1 |
| 2013/0086236 A1* | 4/2013 | Baucke | H04L 45/50 709/223 |
| 2014/0026231 A1 | 1/2014 | Barak et al. | |

OTHER PUBLICATIONS

Itskin et al., "Creating Network Isolation Between Virtual Machines," U.S. Appl. No. 14/671,120, filed Mar. 27, 2015.
List of IBM Patents or Patent Applications Treated as Related, Mar. 27, 2015.

* cited by examiner

CREATING NETWORK ISOLATION BETWEEN VIRTUAL MACHINES

BACKGROUND

This disclosure relates generally to computer system networking, and more particularly to creating network isolation between virtual machines.

In networking technology, virtual local area networks (VLANs) are used to isolate network traffic. However, in a cloud environment, it may not be possible to create enough VLANs to isolate traffic due to limitations on the physical Ethernet adapters and switches, for example. A physical computer may include several virtual machines (VMs), which are logical emulations of a physical computer. The physical computer may host multiple VMs, each sharing the hardware resources of the physical computer, and each emulating a physical computer. In a cloud environment, a physical computer may include VMs that may belong to different organizations within the same enterprise, or to several unrelated enterprises, each sharing the physical computing environment. In general, several VMs may share the same physical Ethernet adapter. Although one physical network adapter may be trunked, i.e., carry multiple VLANs, it may not be physically possible to create enough VLANs to keep traffic segregated, for example to ensure security and to maintain adequate performance.

To maintain network security, VLANs, internet protocol (IP) subnets and addresses, and media access control (MAC) addresses may be used to keep network traffic segregated among the different organizations. However, in a cloud environment an organization or enterprise may only lease a VM for a brief period of time, such as for example, to process a monthly payroll. Consequently, VMs may be continually deployed and destroyed, resulting in repeated reuse of IP addresses and MAC on the physical computer. This, along with the probability that VMs on a physical computer may belong to multiple enterprises, increases the challenge of isolating network traffic and keeping out external undesired network traffic.

SUMMARY

According to one embodiment, a method for creating network isolation between virtual machines is provided. The method includes: receiving, by a security virtual machine (SVM), an outgoing network packet from a virtual machine (VM); extracting a source internet protocol (IP) address and a source media access control (MAC) address from the outgoing network packet; searching a zone identifier table for a zone id, wherein the zone identifier table includes the source IP address and the source MAC address; sending the outgoing network packet to a physical Ethernet adapter that is connected to an external network switch wherein the external network switch is connected to an external network, based on the zone id not being found in the zone identifier table; and sending the outgoing network packet to a physical Ethernet adapter that is connected to an internal switch, based on the zone id being found in the zone identifier table.

According to another embodiment, a computer program product for creating network isolation between virtual machines is provided. The computer program product includes a computer readable storage medium readable by a processing circuit and storing instructions for execution by the processing circuit for performing a method is provided. The method includes: receiving, by a security virtual machine (SVM), an outgoing network packet from a virtual machine (VM); extracting a source internet protocol (IP) address and a source media access control (MAC) address from the outgoing network packet; searching a zone identifier table for a zone id, wherein the zone identifier table includes the source IP address and the source MAC address; sending the outgoing network packet to a physical Ethernet adapter that is connected to an external network switch wherein the external network switch is connected to an external network, based on the zone id not being found in the zone identifier table; and sending the outgoing network packet to a physical Ethernet adapter that is connected to an internal switch, based on the zone id being found in the zone identifier table.

According to another embodiment, a computer system for creating network isolation between virtual machines is provided. The computer system includes a memory, a processing unit communicatively coupled to the memory, and a management module communicatively coupled to the memory and processing unit, whereby the management module is configured to perform the steps of a method is provided. The method includes: receiving, by a security virtual machine (SVM), an outgoing network packet from a virtual machine (VM); extracting a source internet protocol (IP) address and a source media access control (MAC) address from the outgoing network packet; searching a zone identifier table for a zone id, wherein the zone identifier table includes the source IP address and the source MAC address; sending the outgoing network packet to a physical Ethernet adapter that is connected to an external network switch wherein the external network switch is connected to an external network, based on the zone id not being found in the zone identifier table; and sending the outgoing network packet to a physical Ethernet adapter that is connected to an internal switch, based on the zone id being found in the zone identifier table.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

A physical computer may include several virtual machines (VMs), which are logical emulations of a physical computer. The physical computer may host multiple VMs, each sharing the hardware resources of the physical computer, and each emulating a physical computer.

The present disclosure relates generally to the field of computer networking, and more particularly to creating network isolation between virtual machines. In networking technology, virtual local area networks (VLANs) are commonly used to isolate network traffic. In a cloud computing environment, the physical computer may host multiple VMs, each sharing the hardware resources of the physical computer, and each emulating a physical computer. However, in a cloud, it may not be possible to create enough VLANs to isolate network traffic due to limitations on the physical Ethernet adapters and switches, for example. The following described exemplary embodiments provide a security virtual machine (SVM) manager and an SVM agent in a system, method and program product to create network isolation between virtual machines.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
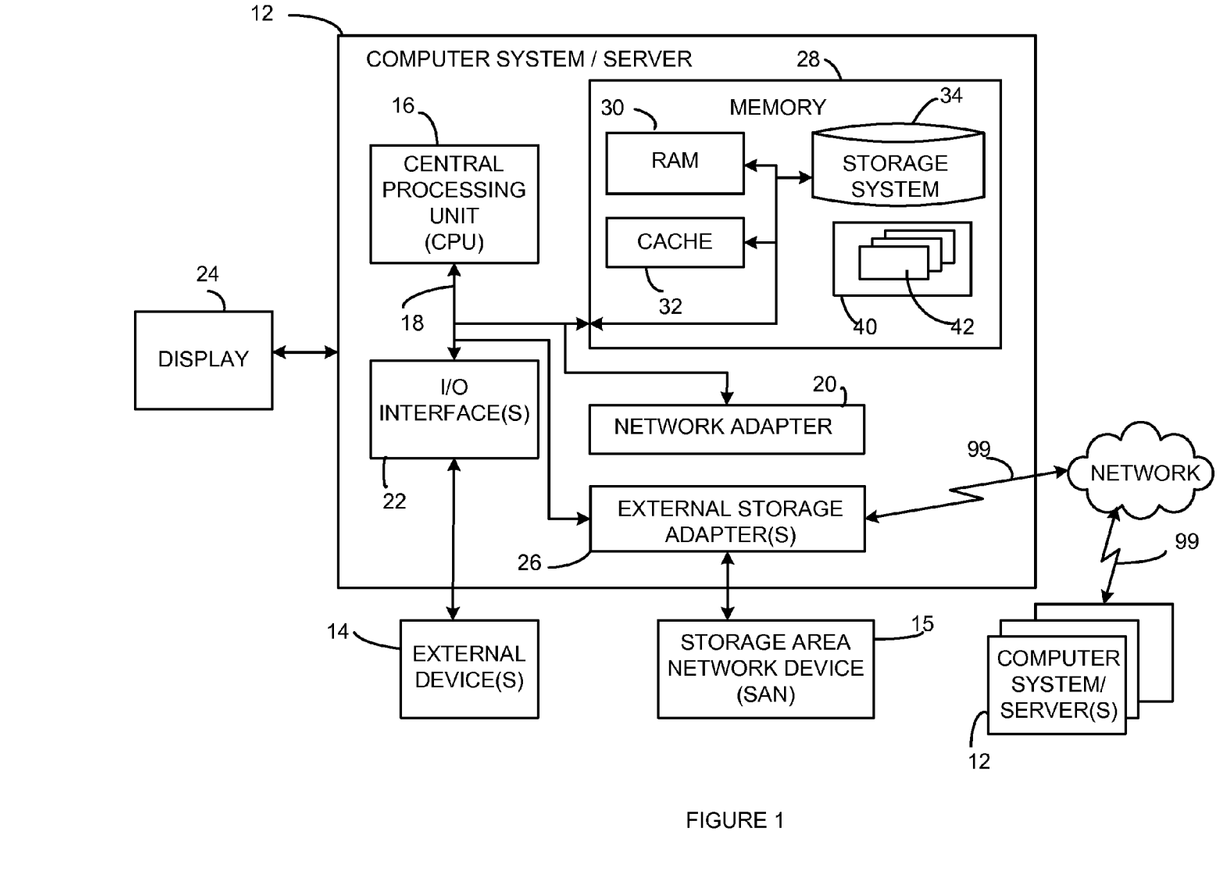
FIG. 1 illustrates an exemplary computing node operable for various embodiments of the disclosure.

Turning now to FIG. 1, a block diagram of an exemplary computer system (i.e., server) 12 operable for various embodiments of the disclosure is presented. As shown, the server 12 is only one example of a suitable computer for creating network isolation between virtual machines and is not intended to suggest any limitation as to the scope of use or functionality of embodiments of the disclosure described herein.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 may be described in the context of executable instructions, such as a program, or more specifically, an operating system (OS) 40 that is an aggregate of program modules 42 being executed by the processing unit 16 to control the operation of the server 12. The program modules 42 perform particular tasks of the OS 40, such as process management; memory management; and device management. The program modules 42 may be implemented as routines, programs, objects, components, logic, or data structures, for example. The program modules 42 performing the particular tasks may be grouped by function, according to the server 12 component that the program modules 42 control. At least a portion of the program modules 42 may be specialized to execute the algorithm of FIG. 3.

In a distributed computing environment, such as a cloud computing environment, each participating server 12 may be under the control of an OS 40 residing on each local and remote server 12, respectively. In a virtual machine, also referred to as a virtual server, each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

As shown in FIG. 1, the components of the server 12 may include, but are not limited to, one or more processors or processing units 16, a system memory 28, and a bus 18 that couples various system components, such as the system memory 28, to the processing unit 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The program modules 42, the OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22.

The server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18. However, in a multi-tenant datacenter (MTD) environment, such as a cloud computing environment, network communications may be routed through the member servers 12 and virtual machines through both physical devices (e.g., network adapters network switches), and virtualized networks, such as those implemented using software defined networking (SDN).

External storage adapter 26 connects the server 12 with external storage subsystems, such as a storage area network (SAN) 15 or RAID array. Exemplary external storage adapters 26 include, but are not limited to, a host bus adapter (HBA), host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

Figure 2:
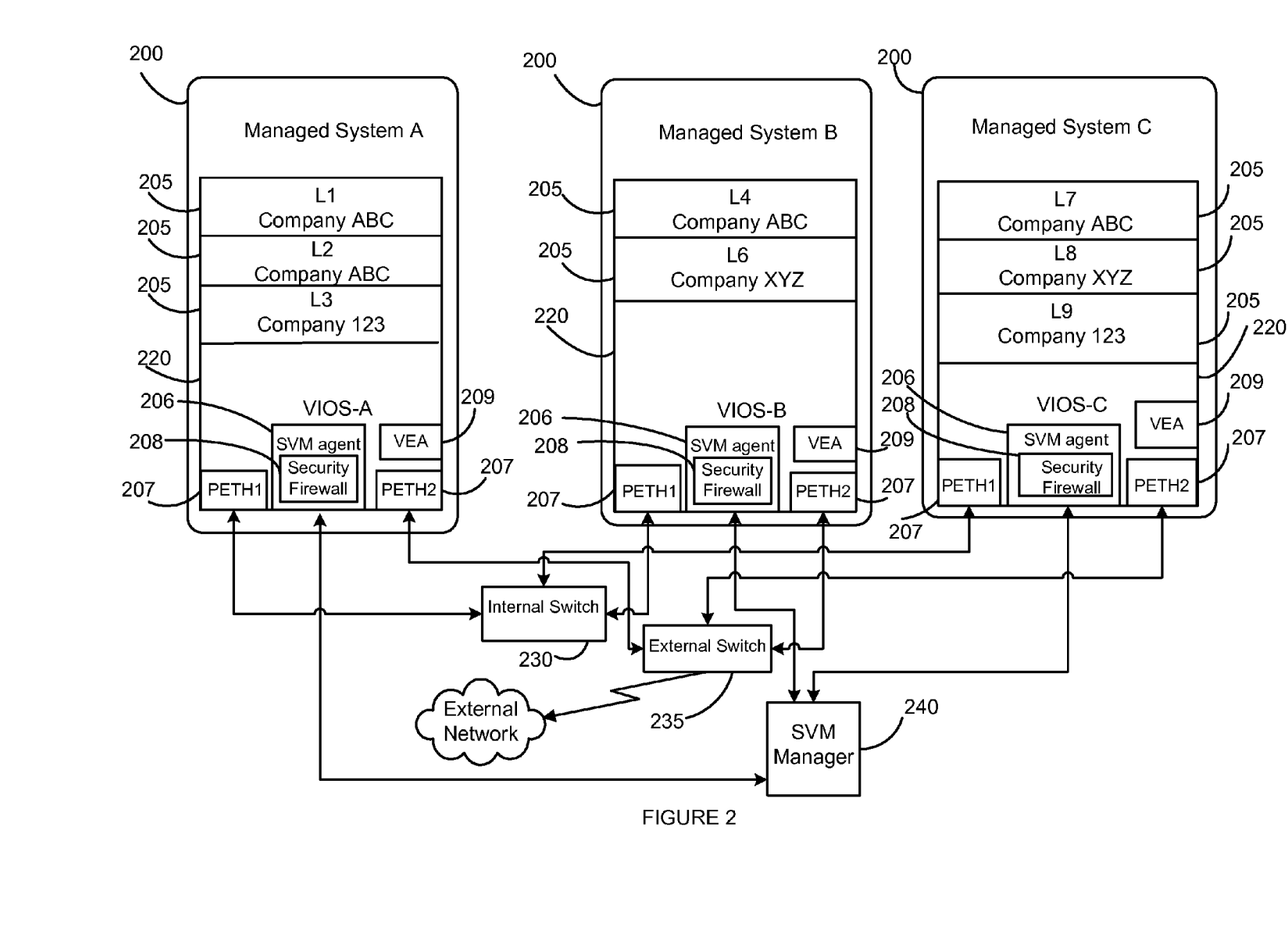
FIG. 2 illustrates an exemplary computing environment, according to various embodiments of the disclosure.

Referring now to FIG. 2, an exemplary computing environment is illustrated. Three computer systems 12 (FIG. 1), herein referred to as managed systems 200, are shown. However, a flexible number of managed systems 200 may participate, such as for example in a distributed cloud computing environment. Additionally, the managed systems 200 may include a variety of hardware and software architectures, such as Linux® and Windows® (Linux is the registered trademark of Linus Torvalds in the United States, other countries, or both. Microsoft, Windows, and the Windows logo are trademarks of Microsoft Corporation in the United States, other countries, or both).

Each managed system 200 may include multiple instances of one or more virtualization technologies, including for example, VMs 205, containers, and logical partitions (LPARs). Each managed system 200 includes a virtual input/output server (VIOS) 220. A VIOS is a specialized operating system and virtual machine combination that together facilitates the sharing, i.e., virtualization, of physical hardware resources among the client VMs 205 on the managed system 200.

Each of the managed systems 200 shown in FIG. 2 includes two physical Ethernet adapters (PETH) 207, PETH1 and PETH2 that are included as part of the VIOS 220 configuration. At least one PETH 207 on each managed system 200 is attached to an internal switch 230, which is configured to route network traffic among the VMs 205 in the managed systems 200 without first having to access an external network. At least one PETH 207 on each managed system is attached to an external switch 235 that receives and sends network traffic to and from the external network but is not directly connected to an internal network. Thus, internal network traffic is securely segregated from external network traffic. Additional physical Ethernet adapters may be included, for example, to increase network traffic throughput. The VIOS 220 may use the PETHs 207 that are assigned to its configuration to generate one or more virtual Ethernet adapters (VEA) 209. The VEA 209 allows VMs 205 to communicate with each other without having PETHs 207 in their configurations.

Each VIOS 220 also includes an SVM agent 206 that maintains a zone identifier table of logical zones that exist on the managed system 200. A logical zone may contain the VMs 205 that belong to the same organization or business enterprise, regardless of subnet or VLAN, and regardless of which managed system 200 hosts the VM 205. For example, VMs 205 L3 and L9 both belong to Company 123 and are both in zone 2, even though L3 is on Managed System A and L9 is on Managed System C. Therefore both L3 and L9 are included in the zone identifier tables of the SVM agent 206 of VIOS-A 220 and the SVM agent 206 of VIOS-C 206. Network packets sent between L3 and L9 may use the internal switch 230 (FIG. 2), based on being in the same logical zone. The zone identifier table includes data uniquely identifying each of the VMs 205 that are defined within the logical zones on the managed system 200. Based on the zone identifier table, the SVM agent 206 routes intra-zone network traffic using the internal switch 230, but inter-zone network traffic is routed using the external switch 235.

Table 1 illustrates an exemplary zone identifier table for the managed system 200 Managed System A.

TABLE 1

Zone Identifier Table For Managed System A

| VM ID | ZONE ID | IP ADDRESS | MAC ADDRESS | INSTANCE ID |
|---|---|---|---|---|
| L1 | 1 | IP 1 | MAC 1 | 1234 |
| L2 | 1 | IP 2 | MAC 2 | 2468 |
| L3 | 2 | IP 3 | MAC 3 | 1357 |
| L4 | 1 | IP 4 | MAC 4 | 1459 |
| L5 | 1 | IP 5 | MAC 5 | 7527 |
| L7 | 1 | IP 6 | MAC 6 | 9437 |
| L9 | 2 | IP 7 | MAC 7 | 5467 |

Table 2 illustrates an exemplary zone identifier table for the managed system 200 Managed System B.

TABLE 2

Zone Identifier Table For Managed System B

| VM ID | ZONE ID | IP ADDRESS | MAC ADDRESS | INSTANCE ID |
|---|---|---|---|---|
| L1 | 1 | IP 1 | MAC 1 | 1234 |
| L2 | 1 | IP 2 | MAC 2 | 2468 |
| L4 | 1 | IP 4 | MAC 4 | 1459 |
| L6 | 3 | IP 9 | MAC 9 | 7419 |
| L7 | 1 | IP 6 | MAC 6 | 9437 |
| L8 | 3 | IP 10 | MAC 10 | 8934 |

Table 3 illustrates an exemplary zone identifier table for the managed system 200 Managed System C.

TABLE 3

Zone Identifier Table For Managed System C

| VM ID | ZONE ID | IP ADDRESS | MAC ADDRESS | INSTANCE ID |
|---|---|---|---|---|
| L2 | 1 | IP 2 | MAC 2 | 2468 |
| L3 | 2 | IP 3 | MAC 3 | 1357 |
| L4 | 1 | IP 4 | MAC 4 | 7800 |
| L6 | 3 | IP 9 | MAC 9 | 7419 |
| L7 | 1 | IP 6 | MAC 6 | 9437 |
| L8 | 3 | IP 10 | MAC 10 | 8934 |
| L9 | 2 | IP 11 | MAC 11 | 8754 |

Each entry in Table 1, Table 2, and Table 3 identifies a VM 205 on a managed system 200. A unique virtual machine identifier (VM ID), for example a name of the VM 205, is associated with each VM 205 on a managed system 200. The VM ID may be unique within a managed system 200, but may not be unique within the cluster because other information in the zone identifier table will uniquely identify the VM 205. Each zone identifier table entry also includes an IP address that is unique in the network, here represented as IP 1 through IP 11, which the SVM agents 206 use to determine how to route traffic to the VMs 205. A unique hardware MAC address, here represented as MAC 1 through MAC 11, identifies the default physical or virtual Ethernet adapter in the VM 205 for communicating with the SVM agent 206. The SVM manager 240 may generate an INSTANCE ID that is unique, and therefore may be non-reusable, within a managed system 200. Alternatively, the SVM manager 240 may adopt the unique INSTANCE ID generated by the cloud orchestrator, hardware management console, or other cluster management facility upon creation of the VM 205. The zone identifier (ZONE ID) may be set at the SVM 240 by an administrator, for example, when defining logical network zones and assigning to the zones those VMs 205 belonging to the same organization. The combination of VM identifier (VM ID), instance identifier (INSTANCE ID), ZONE ID, IP address and MAC address on a managed system 200 ensures the VM 205 is always uniquely identified, since, for example, VM ID, MAC address, and IP address may be re-assigned and reused when a VIOS 220 instantiates a new VM 205.

The SVM agent 206 also includes a security firewall 208 that may receive firewall rules from the SVM manager 240. Each organization having VMs 205 on the managed systems 200 may define firewall rules for the VMs 205 within its zone. The SVM agent 206, in conjunction with the security firewall 208, may apply the firewall rules to filter network traffic entering the managed system 200 from the external switch 235.

The SVM agents 206 on the managed systems 200 form a cluster under the coordination of the SVM manager 240. The SVM manager 240, which may be implemented on a VM 205 within a managed system 200, a standalone computer, or other computing platform, maintains zone identifier tables for all the managed systems 200 within its cluster. A cloud orchestrator (not shown) provides centralized management of the cloud infrastructure, such as for hardware and software provisioning. If the cloud orchestrator modifies the configuration of a managed system 200, for example by adding or deleting a VM 205, or propagating firewall rules, the cloud orchestrator may communicate that modification to the SVM manager 240. The SVM manager 240 updates its zone identifier tables to reflect the modification, and pushes out the modified zone identifier tables to the affected SVM agents 206. The SVM manager 240 may push updated firewall rules to the external switch 235 and/or to the security firewalls 208 of the SVM agents 206.

Figure 3:
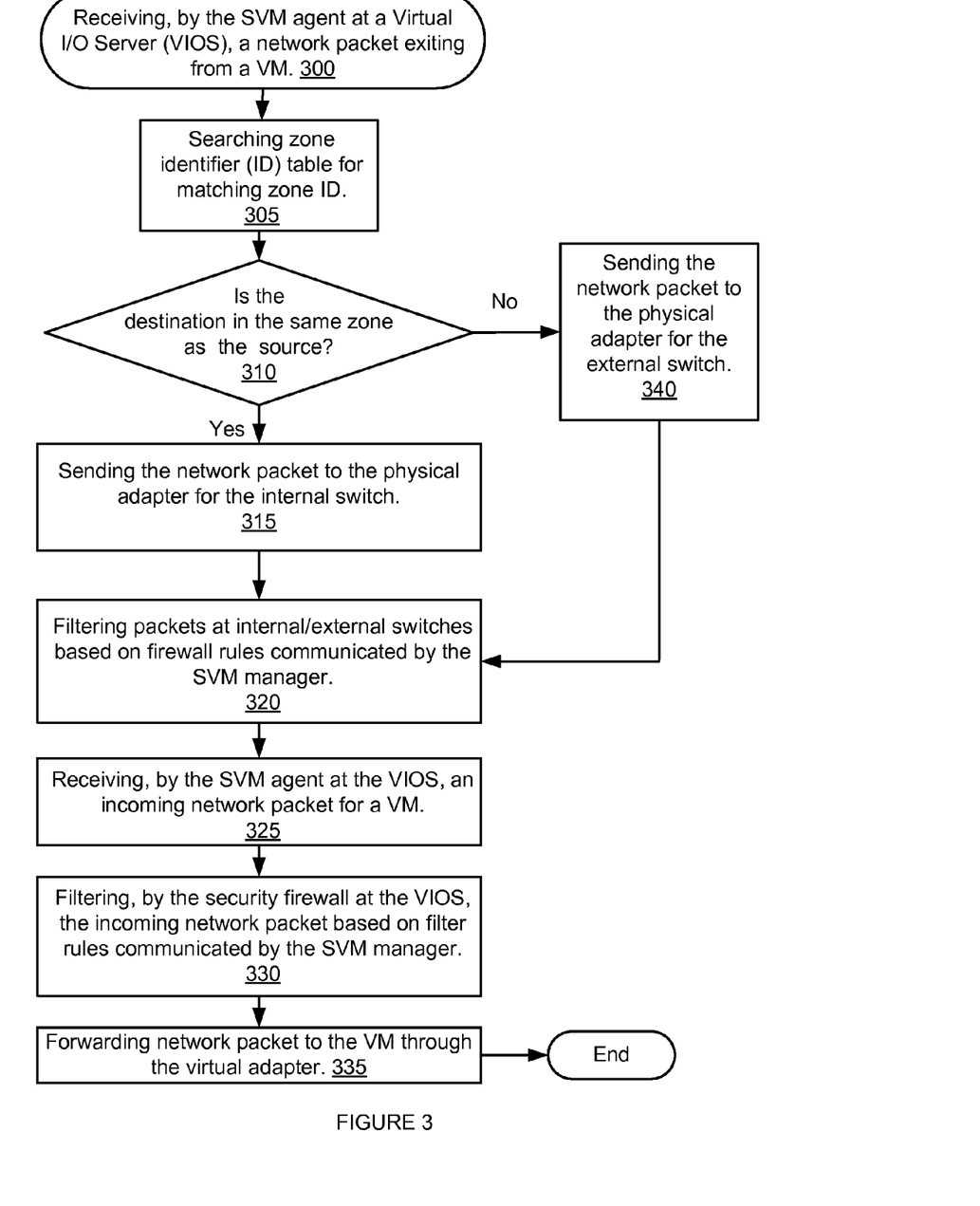
FIG. 3 is an operational flowchart illustrating an algorithm for creating network isolation between virtual machines, according to various embodiments of the disclosure.

Referring now to FIG. 3, an algorithm for creating network isolation between virtual machines, according to various embodiments of the disclosure, is illustrated. At 300, the SVM agent 206 (FIG. 2) receives an outgoing network packet (i.e., egress) from one of the VMs 205 (FIG. 2) on a managed system 200 (FIG. 2). At 305 the SVM agent 206 extracts the sender's IP address and the destination IP address from the network packet header. The SVM agent 206 searches its local zone identifier table for the destination IP address. If the destination IP address is found, then the SVM agent 206 searches its local zone identifier table to locate a ZONE ID corresponding to the IP address of the source and destination VMs 205.

At 310 if the source and destination IP addresses are not in the same zone, at 340 the network packet is sent to PETH2 207 (FIG. 2), which is the physical Ethernet adapter connected to the external switch 235 (FIG. 2), and ultimately to the external network. The network packet is then received at the external switch 235 (FIG. 2). At 320, depending on firewall rules, the external switch 235 (FIG. 2) may route the network packet to the PETH 207 (FIG. 2) that is connected to the managed system 200 (FIG. 2) where the destination VM 205 (FIG. 2) is located. Network administrators may define firewall rules for the general security of the cluster as a whole. For example, firewall rules at both the external switch 235 and the internal switch 230 may prevent incoming traffic from certain undesirable sites that are known to promote hacking, but allow streaming video from such sites as YouTube™ (YouTube is a trademark of Google Inc.).

At 325 the SVM agent 206 (FIG. 2) at the destination managed system 200 (FIG. 2) receives the incoming network packet (i.e., ingress). At 330, the security firewall 208 (FIG. 2) at the destination SVM agent 206 (FIG. 2) may further filter the incoming network packet based on firewall rules defined at the SVM manager 240, or cloud orchestrator, and pushed to the security firewalls 208 (FIG. 2). For example, the administrator of zone 1 may define firewall rules at the SVM manager 240 (FIG. 2) to allow streaming video. However, the firewall rules for zone 2 may block streaming video. As a result, when the external switch 235 or the internal switch 230 transmits streaming video network packets, the security firewall 208 at Managed System A (FIG. 2) may permit streaming video to zone 1 VMs 205, but block streaming video to those in zone 2. At 335, the network packet is delivered to the destination VM 205 (FIG. 2), having successfully passed the filtering process.

However, if at 310 the SVM agent 206 (FIG. 2) determines that the source and destination IP addresses are in the same zone, at 315 the SVM agent 206 (FIG. 2) sends the network packet to the internal switch 230 (FIG. 2). As in processing network packets at the external switch 235 (FIG. 2), switch-level firewall rules are applied at 320. At 325 the SVM agent 206 (FIG. 2) at the destination managed system 200 (FIG. 2) receives the incoming network packet (i.e., ingress). At 330 the security firewall 208 (FIG. 2) at the destination SVM agent 206 (FIG. 2) may further filter the incoming network packet, applying zone-level firewall rules. At 335, the network packet is delivered to the destination VM 205 (FIG. 2), having successfully passed the filtering process.

Figure 4:
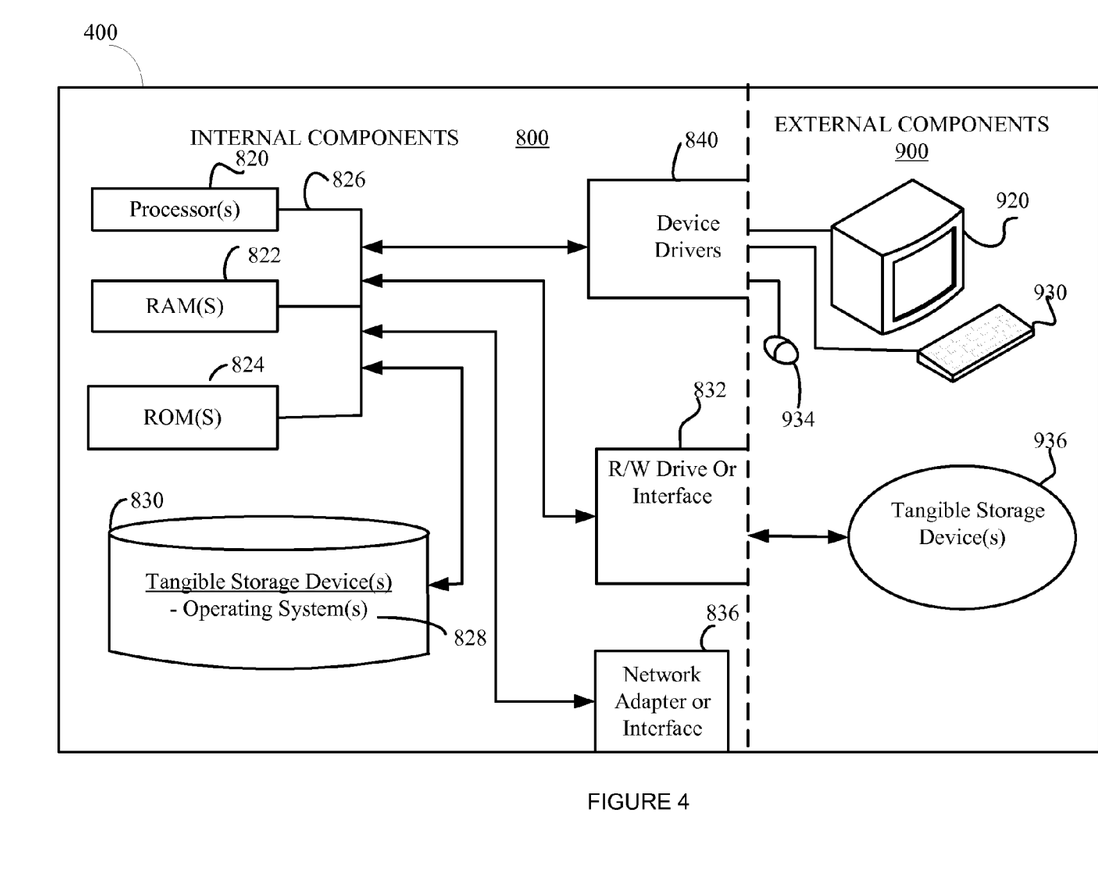
FIG. 4 is a schematic block diagram of hardware and software of the computer environment according to an embodiment of the processes of FIG. 3.

Referring now to FIG. 4, computing device 400 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIG. 3; and one or more computer-readable tangible storage devices 830. The one or more operating systems 828 (including the additional data collection facility) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 400, can be downloaded to computing device 400 from an external computer (e.g., server) via a network (for example, the Internet, a local area network, or other wide area network) and respective network adapters or interfaces 836. From the network adapters (or switch port adapters) or interfaces 836 and operating system 828 associated with computing device 400 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for creating network isolation between virtual machines comprising:
   receiving, by a security virtual machine (SVM) agent on a managed system, an outgoing network packet from a virtual machine (VM);
   extracting source and destination data from the outgoing network packet, wherein the source data includes at least a source internet protocol (IP) address, a source media access control (MAC) address, and wherein the destination data includes at least a destination IP address, and a destination MAC address;
   searching a zone identifier table for a source entry including the source data from the outgoing network packet, and extracting a source zone identifier (id) from the source entry;
   searching the zone identifier table for a destination entry including the destination data from the outgoing network packet, and extracting a destination zone identifier (id) from the destination entry, based on the destination data being located in the zone identifier table;
   routing the outgoing network packet to a first physical Ethernet adapter connected to an internal switch, based on the source zone id matching the destination zone id;
   routing the outgoing network packet to a second physical Ethernet adapter connected to an external switch, based on the destination data not being located in the zone identifier table, and the source zone id not matching the destination zone id; and
   modifying one or more zone identifier table, by an SVM manager, wherein each zone identifier table corresponds to the managed system being managed by the SVM agent, and wherein the modifying further comprises;
   modifying one or more firewall rules; and
   pushing the modified one or more zone identifier table and the modified one or more firewall rules to the SVM agent, based on the VM and a logical zone resident on the VM.

2. The method of claim 1, further comprising:
   receiving at the SVM agent, an incoming network packet for a VM;
   applying, by a security firewall component of the SVM agent, the one or more firewall rules;
   delivering the incoming network packet to the VM through a virtual Ethernet adapter, based on the incoming network packet being allowed by the one or more firewall rules; and
   rejecting the incoming network packet based on the incoming network packet not being allowed by the one or more firewall rules.

3. The method of claim 1, wherein the SVM agent on the managed system comprises:
   a security firewall comprising:
   the one or more firewall rules grouped by zone id, wherein each zone id corresponds to the logical zone in at least one of: a software defined network (SDN), a physical network, and a virtual network; and
   a zone identifier table identifying the VMs belonging to the logical zone on the managed system.

4. The method of claim 1, wherein the zone identifier table comprises at least:
   the zone id,
   a VM identifier (id),
   an IP address,
   a MAC address, and
   an instance identifier (id).

5. The method of claim 1, further comprising:
   receiving, by the SVM agent, the zone identifier table from the SVM manager.

6. The method of claim 1, wherein the external switch is connected to an external network, the internal switch is connected to an internal network, and the network packets routed on the internal switch are segregated from the network packets routed on the external switch, based on the logical zone.

* * * * *